J. COPLON.
SPEED INDICATING AND SIGNALING DEVICE.
APPLICATION FILED MAY 1, 1912.

1,117,335.  Patented Nov. 17, 1914.

WITNESSES:   INVENTOR.
Walter H. Kelley   Joseph Coplon
Bessie E. Dempsey   BY J. Wm Ellis
   ATTORNEY

UNITED STATES PATENT OFFICE.

JOSEPH COPLON, OF BUFFALO, NEW YORK.

SPEED INDICATING AND SIGNALING DEVICE.

1,117,335.   Specification of Letters Patent.   Patented Nov. 17, 1914.

Application filed May 1, 1912. Serial No. 694,410.

*To all whom it may concern:*

Be it known that I, JOSEPH COPLON, a citizen of the United States of America, residing at Buffalo, in the county of Erie and State of New York, have invented certain new and useful Improvements in Speed Indicating and Signaling Devices, of which the following is a full, clear, and exact description.

The general object of my invention is to provide a device for use in connection with tachometers or other indicating instruments, which shall close an electric circuit when any predetermined indicating point on said instrument is reached.

My device is especially adapted for use on speedometers or tachometers, such as are supplied on motor vehicles, so that when the travel of the vehicle has reached a predetermined speed, the operator thereof, will be warned either visably by means of an electric lamp or audibly by means of an electric bell, that the speed limit has been exceeded.

Moreover, my device is easily and quickly attached to speedometers of the standard types and is simple in its operation, cheap to manufacture and will not easily get out of order.

I have attained the advantages above set forth by the device herein described, but obviously, many other advantages resulting from its use will be apparent to those skilled in the art.

Figure 1:
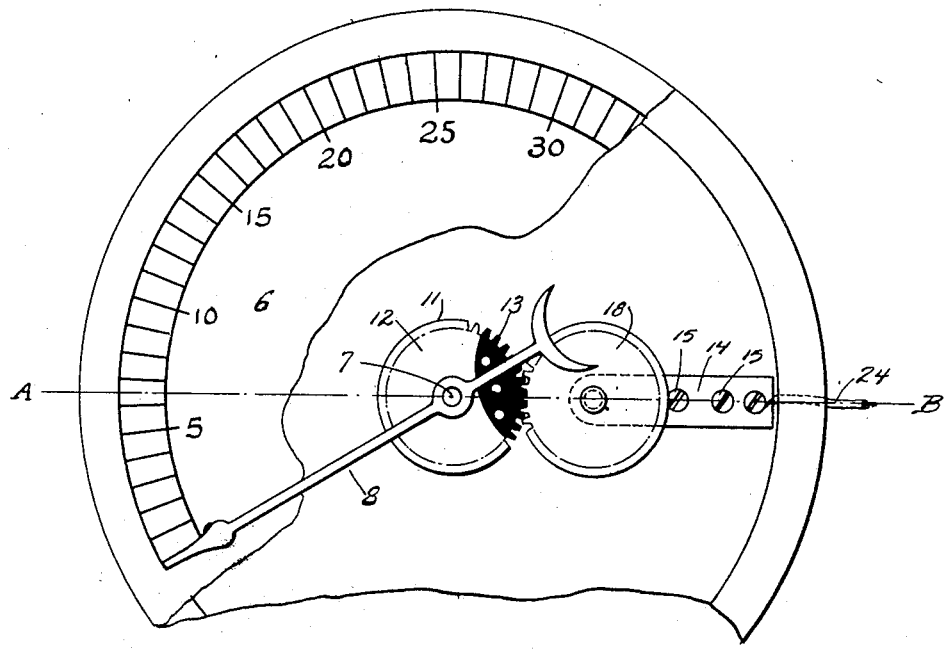
Figure 2:
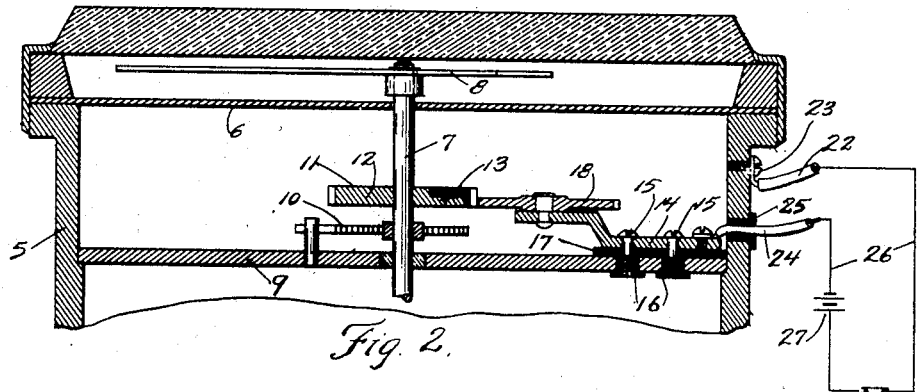
Figures 3, 4:
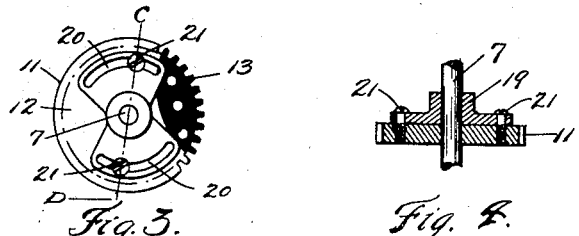

Reference is to be had to the accompanying drawings, forming part of this specification, in which like characters of reference indicate like parts throughout the several views of which:

Figure 1 is a fragmental plan view of a speedometer with my device attached thereto. Fig. 2 is a fragmental sectional elevation of the same and is taken on line A—B of Fig. 1. Fig. 3 is a plan view of a modified means for securing part of my device to the spindle of the speedometer. Fig. 4 is a sectional elevation of the same and is taken on line C—D of Fig. 3.

In the drawings, 5 represents the inclosing case of the speedometer and 6 is the dial thereof.

7 is the spindle of the speedometer, 8 the indicating needle, 9 the armature or partition plate and 10 the helical spring, which keeps the indicating needle at zero when the instrument is at rest.

Disposed on the spindle 7 of the speedometer is the circuit controlling gear 11 of my device. This gear comprises a metallic part 12 and a non-metallic segment 13. The non-metallic segment 13 is made of insulating material and extends around the periphery of the gear 11 for a suitable distance. The periphery of the metallic part 12 of the gear is indented where the non-metallic segment 13 is placed and the face of the gear is recessed (Fig. 2) so as to enable the non-metallic segment 13 to be secured thereto by rivets or other suitable means.

14 is a metallic arm which is secured to the armature or partition plate 9 of the speedometer by means of screws 15, which are screw-threaded into insulating bushings 16 passed through said armature or partition plate 9. A strip of insulating material 17 is interposed between said arm and said armature or partition plate, so as to thoroughly insulate the said arm from the body of the speedometer.

Rotatably carried at the outer end of the arm 14 is a contact gear 18, which meshes with the circuit controlling gear 11.

Referring to Figs. 3 and 4, 19 is a slotted flange which is provided with concentric slots 20, disposed diametrically opposite each other. This flange is rigidly secured to the spindle 7 and is disposed on top of the gear 11. When this flange is used, the gear 11 is rotatably mounted on the spindle 7 and is held against the said flange by means of the screws 21 which pass through the slots 20 in the said flange, thus providing means for adjusting the position of the gear with relation to the indicating needle 8 of the speedometer.

22 represents an electric terminal, which is grounded on the case 5, and is held in place by a suitable screw 23. Another terminal 24 passes through an insulating bushing 25 in the outer wall of the case 5 and is connected with the arm 14 by suitable connecting means.

In Fig. 2, I have represented in a diagrammatical manner, an electric circuit 26, an electric battery 27, and an electric bell 28, and my device connected in series therewith.

For convenience in the drawings, the gears 11 and 18 are shown with only a portion of their peripheries provided with gear teeth, but obviously, these gear teeth are, in practice, cut around the entire circumference of the said gears.

It will be clearly seen that when the speedometer is in operation, the spindle 7 carrying the needle will be rotated to the point on the scale corresponding to the rate of travel of the vehicle on which the speedometer is placed. As shown in the drawings, the indicating needle is at zero and at this point the non-metallic segment 13 of the gear 11 is in mesh with the contact gear 18 and in this position, no current will flow through the electric circuit. As the spindle 7 revolves, the circuit controlling gear 11 is also revolved and when it has rotated to a point where the metallic part 12 will mesh with the contact gear 18, the circuit will be closed and the alarm sounded. This alarm will continue as long as the metallic part 12 of the circuit controlling gear is in mesh with the contact gear 18 and until the indicator shows that the speed of the vehicle has been reduced, whereupon the non-metallic segment 13 of the circuit controlling gear will again mesh with the contact gear 18 and open the circuit. When it is desired to change the point at which the gears will make contact, to suit different speed requirements, the gear 11 may be slightly rotated on the spindle 7. In the form shown in Figs. 1 and 2, the gear, which is snugly fitted on the spindle, may be slightly rotated to effect the change in position. When adjusting the gear, shown in Figs. 3 and 4, the screws 21 are loosened and the gear 11 rotated to the desired point, whereupon, the screws are again tightened up in place.

While I have shown the arm 14 secured to the armature or partition plate 9, it is obvious that this arm may be carried by the body of the speedometer or any other stationary part thereof. Further, the gears 11 and 18 may be transposed, if desired, so that the contact gear will be carried by the spindle 7 and the circuit controlling gear carried by the arm 14. These and other modifications may be made from the device, as herein shown and described, without departing from the spirit of my invention or the scope of the appended claims and I do not wish to be limited to the exact embodiment herein shown and described.

Having thus described my invention, what I claim is:

1. The combination with a speedometer, of circuit controlling means, comprising a grounded part and an insulated part, said circuit controlling means being carried by and rotatable with the spindle of said speedometer and contact means carried by and insulated from the body of said speedometer, said contact means being normally in mechanical contact with the insulated part of said circuit controlling means, whereby an electric contact is made at a predetermined point in the revolution of the said circuit controlling means.

2. The combination with a speedometer, of circularly shaped circuit controlling means, comprising a grounded part and an insulated part, said circuit controlling means being carried by and rotatable with the spindle of said speedometer and contact means carried by and insulated from the body of said speedometer, said contact means being normally in mechanical contact with the insulated part of said circuit controlling means, whereby an electric contact is made at a predetermined point in the revolution of the said circuit controlling means.

3. The combination with a speedometer, of a circuit controlling gear carried by and rotatable with the spindle of said speedometer and a contact gear carried by and insulated from the body of said speedometer, said contact gear meshing with said circuit controlling gear, whereby an electric contact is made at a predetermined point in the revolution of said circuit controlling gear.

4. The combination with a speedometer, of a circuit controlling gear carried by and rotatable with the spindle of said speedometer, said circuit controlling gear comprising a metallic part and an insulated segment and a contact gear carried by and insulated from the body of said speedometer, said contact gear meshing normally with the insulated segment of said circuit controlling gear, whereby when said circuit controlling gear is rotated to a predetermined point, the said contact gear will mesh with the metallic part of said circuit controlling gear and close an electric circuit.

5. The combination with a speedometer, of a slotted flange rigidly mounted on the spindle of said speedometer, a circuit controlling gear loosely mounted on the spindle of said speedometer adjacent to said flange, screws passing through the slots in said slotted flange and adjustably securing the same to said circuit controlling gear and a contact gear carried by and insulated from the body of said speedometer, said contact gear meshing with said circuit controlling gear, whereby the position of the gear may be adjusted and an electric contact is made at a predetermined point in the revolution of said spindle and circuit controlling gear.

6. The combination with a speedometer, of a flange rigidly mounted on the spindle of said speedometer, a circuit controlling gear adjustably mounted on the spindle of said speedometer, said circuit controlling gear comprising a metallic part and an insulated segment, means securing said circuit controlling gear to said flange and a contact gear carried by and insulated from the body of said speedometer, said contact gear meshing with said circuit controlling gear, whereby when said circuit controlling gear is rotated to a predetermined point, the said contact gear will mesh with the metallic part of said circuit controlling gear and close an electric circuit.

In testimony whereof, I have hereunto signed my name in the presence of two subscribing witnesses.

JOSEPH COPLON.

Witnesses:
J. WM. ELLIS,
WALTER H. KELLEY.